No. 818,274. PATENTED APR. 17, 1906.
M. W. MOREHOUSE.
LINOTYPE MACHINE.
APPLICATION FILED DEC. 11, 1905.
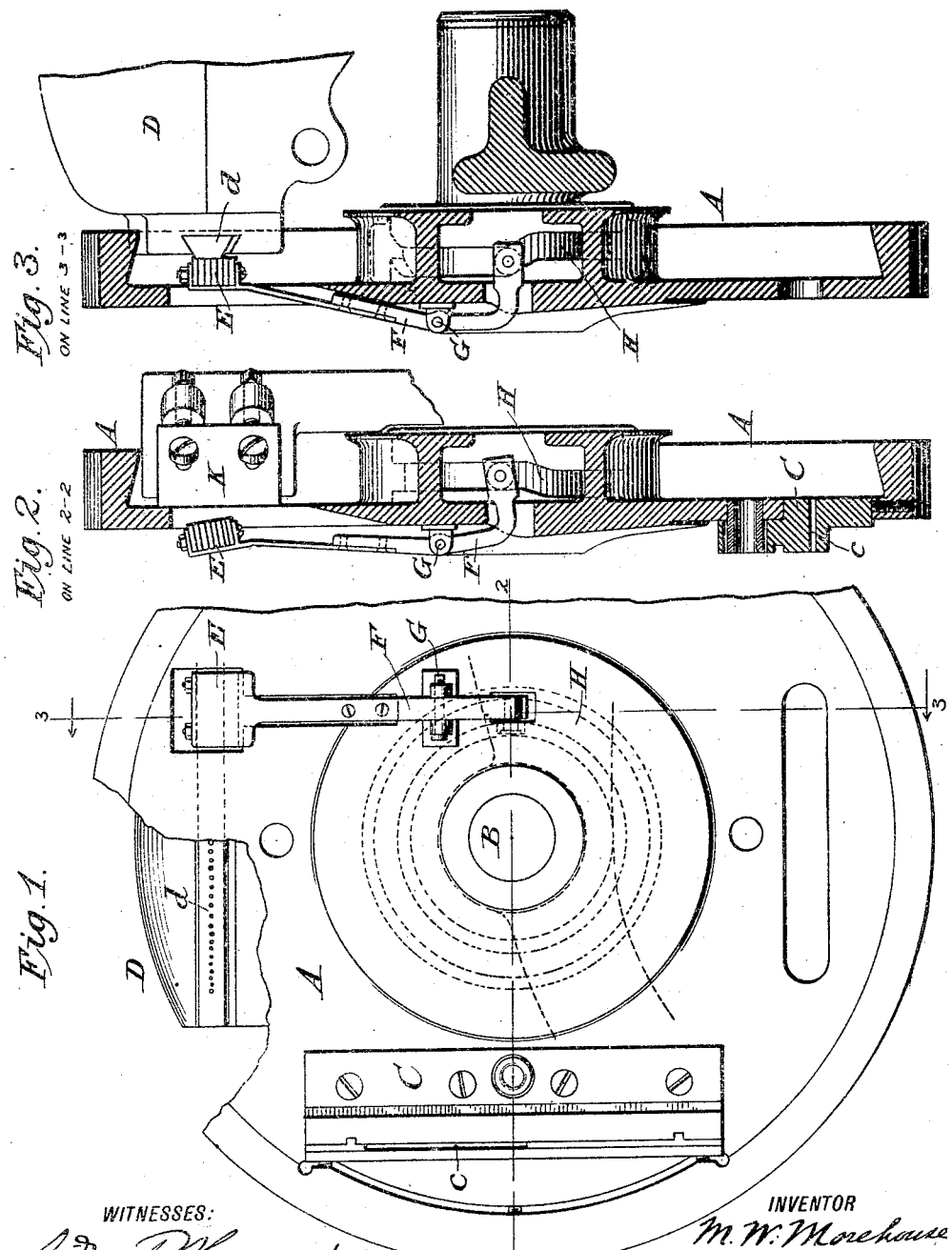

UNITED STATES PATENT OFFICE.

MELVIN W. MOREHOUSE, OF BROOKLYN, NEW YORK, ASSIGNOR TO MERGENTHALER LINOTYPE COMPANY, A CORPORATION OF NEW YORK.

LINOTYPE-MACHINE.

No. 818,274. Specification of Letters Patent. Patented April 17, 1906.

Application filed December 11, 1905. Serial No. 291,358.

*To all whom it may concern:*

Be it known that I, MELVIN W. MOREHOUSE, of the borough of Brooklyn, county of Kings, and State of New York, have invented a new and useful Improvement in Linotype-Machines, of which the following is a specification.

This invention has reference to linotype-machines and kindred machines, wherein an elongated slotted mold carried in an intermittingly-revolving wheel or disk is repeatedly brought in contact with and separated from the mouth of a melting-pot, through which molten type-metal is delivered into the mold, as shown, for example, in Letters Patent of the United States No. 436,532.

The invention has reference to means for automatically removing the dross and other foreign matters from the face of the pot in order that it may be closed tightly against the face of the mold; and it consists, broadly, in the combination of a wiper carried by the wheel in position to act upon the mouth of the pot and also in the combination with such wiper of means for controlling its position forward and backward in relation to the plane of the pot-mouth.

Referring to the drawings, Figure 1 represents a face view of a mold-carrying disk provided with my wiper, a portion being broken away to show the mouth of the melting-pot in the rear. Fig. 2 is a cross-section on the line 2 2 of Fig. 1. Fig. 3 is a section on the line 3 3 of Fig. 1.

Referring to the drawings, A represents a vertical peripherally-flanged intermittingly-rotating wheel or disk mounted on a journal or axis B to turn always in the same direction and containing the mold C. This mold C extends through the disk from front to rear and contains the slot or mold proper, c, in which the slug or linotype is cast. The mold-slot is open at the rear to receive the molten metal, except when closed by the mouth of the pot, and it is open at the front, except when closed by the composed line of matrices, in order that the slug or linotype may be ejected therefrom in a forward direction, as usual. The rear face of the mold, as shown in Fig. 2, stands flush with the rear face of the disk.

D represents the melting-pot, movable to and from the rear face of the mold and provided with a perforated mouthpiece d, through which the molten metal is ejected into the mold while the latter is at rest, the pot being first advanced until the mouthpiece d fits tightly against and closes the rear of the mold, as usual.

The foregoing parts may all be constructed and arranged to operate in the ordinary manner. In applying my improvement I provide a pad or wiper E, of asbestos or other similar material, and attach the same securely to one end of a lever F, seated in a slot in the disk and connected thereto by a pivot G. The inner end of the arm or lever is extended through the disk to the rear side and provided with a stud or roller seated in a cam-groove H, encircling the stationary hub or bearing around which the disk revolves. The arm and wiper are carried with the rotating disk in a circular path. The cam-groove is of such form that when the wiper is carried past the mouth d of the pot it is caused to swing rearward and act forcibly on the mouth while passing thereover, as shown in Figs. 1 and 3. During the remaining portion of its rotation the wiper is swung forward, as indicated in Fig. 2, so that it will not protrude beyond the rear face of the disk and mold and this in order that it may not encounter the stationary knife K, which is located behind the disk, as shown in Fig. 2, and acts to trim the base of the passing slug contained in the mold. The outer end of the arm F is preferably made elastic, so that the pad will be forced with a yielding or spring-pressure against the mouthpiece.

I believe myself to be the first to provide a mold-carrying disk in any form or manner with a wiper adapted to act upon the mouth of the pot and the first to combine with a traveling wiper means for moving the same forward and backward to and from the plane of the pot-mouth, so that it will at one time project in rear of the mold and at other times stand flush with or in advance of the mold-face. The attachment of the pot-wiper to the rotary wheel turning always in the same direction is advantageous in that it permits the wiper to be carried slowly and steadily across the mouth of the pot and in that it is not necessary to hold the pot back away from the mold to permit the return of the wiper to its original position, as would be the case with a reciprocating wiper. It is found also that a wiper which passes always in the same direction across the mouth of the pot has no tendency to return the dross or other impurities to the face of the pot, as is the case with a wiper which moves first in one direction and then in the other.

It will be manifest to the skilled mechanic that the parts may be widely varied in form and arrangement without passing beyond the limits of my invention.

Having described my invention, what I claim is—

1. In a linotype-machine, the combination of a melting-pot, a rotary carrier provided with a mold to coöperate with the pot, and a pot-wiper secured to and carried wholly by the mold-carrier.

2. In a linotype-machine, the combination of a melting-pot, having a delivery-mouth adapted to close the rear side of the mold, a rotary disk turning always in the same direction and provided with a slotted mold, and a pot-wiper carried by said disk.

3. In a linotype-machine, the combination of a melting-pot having a delivery-mouth to close the mold, a rotary disk containing a slotted mold, and a wiper carried by said disk to act upon the mouth of the pot, and movable to and from the plane of the pot-mouth.

4. In a linotype-machine, the combination of a melting-pot, having a delivery-mouth adapted to close the mold, a revolving disk containing a slotted mold, an arm pivoted to said disk and provided with a wiper to act upon the pot-mouth, and a stationary cam controlling the position of said wiper to and from the plane of the pot-mouth.

5. In a linotype-machine, a melting-pot provided with a delivery-mouth, a rotary disk having a slotted mold to coöperate with said mouth, a stationary knife to trim the base of the slug in the mold, a pot-mouth wiper attached to and carried by the disk, and means for moving said wiper rearward against the pot-mouth during its passage thereover, and thereafter moving it forward that it may clear the knife when passing the same.

In testimony whereof I hereunto set my hand, this 6th day of December, 1905, in the presence of two attesting witnesses.

MELVIN W. MOREHOUSE.

Witnesses:
  C. I. McGowan,
  John T. Williams.